United States Patent
Siefert et al.

(10) Patent No.: US 7,410,024 B1
(45) Date of Patent: Aug. 12, 2008

(54) MOUNT HAVING AN IMPROVED RIDER SUPPORT SYSTEM

(75) Inventors: James B. Siefert, Hickory, NC (US); Grant B. Hayes, Wilkesboro, NC (US)

(73) Assignee: Powersport Grafx, LLC, N. Wilkesboro, NC (US)

( * ) Notice: Subject to any disclaimer, the term of this patent is extended or adjusted under 35 U.S.C. 154(b) by 188 days.

(21) Appl. No.: 11/083,044

(22) Filed: Mar. 17, 2005

(51) Int. Cl.
*B62D 61/02* (2006.01)
*B32B 7/12* (2006.01)

(52) U.S. Cl. .................. 180/219; 428/354; 428/141; 428/156; 428/163

(58) Field of Classification Search ................ 428/354, 428/141, 156, 163
See application file for complete search history.

(56) References Cited

U.S. PATENT DOCUMENTS

| | | | | |
|---|---|---|---|---|
| 5,928,827 | A * | 7/1999 | Rajan | 430/124.51 |
| 6,150,035 | A * | 11/2000 | DeFife et al. | 428/500 |
| 6,270,871 | B1 * | 8/2001 | Scholz et al. | 428/40.1 |
| 6,770,360 | B2 * | 8/2004 | Mientus et al. | 428/354 |
| 6,982,112 | B2 * | 1/2006 | Coran | 428/122 |
| 7,090,910 | B2 * | 8/2006 | Courtoy et al. | 428/158 |

OTHER PUBLICATIONS

CONVEX (tm) advertisement, located on website ww.hyatts.com, 2pgs (1st pg ad, 2nd pg product specs), unknown date of origin.*
3M Corp., Instruction Bulletin 4.1, Release D, Effective May 2002.
3M Corp., Product Bulletin 3647, Release C,. Effective Feb. 2003.
3M Corp., Instruction Bulletin 5.33, Release D, Effective Feb. 2005.
Stomp Designs Inc., Stompgrip brochure listing "patent pendinng" on p. 3.
Factory Effex, printout of grip tape sheets from website http://www.factoryeffex.com dated Aug. 2, 2005.
Steelcase Surface Materials ACT Standards; copyright 1996-2005.
Sina Pearson Textiles—ACT Performance Guidelines; undated, possible prior art.
Convex information sheet; undated, possible prior art.
Information on decals from Factoryeffex website; undated, possible prior art.

* cited by examiner

*Primary Examiner*—Tony H. Winner
(74) *Attorney, Agent, or Firm*—MacCord Mason PLLC

(57) ABSTRACT

A mount having an improved rider support system comprising: a mount; and a rider support system comprising: a seat; and a high friction, low abrasion surface adjacent to a rider's legs. In one embodiment of the invention, the mount further includes an adhesive mounting system. Also, in a preferred embodiment of the invention, the high friction, low abrasion surface includes: a surface conforming substrate; a film having an outer textured surface; and an adhesive layer between the surface conforming substrate and the film having an outer textured surface.

44 Claims, 2 Drawing Sheets

MOUNT HAVING AN IMPROVED RIDER SUPPORT SYSTEM

BACKGROUND OF THE INVENTION (1) Field of the Invention

The present invention relates generally to a mount having an improved rider support system and, more particularly, to a rider support system for a mount having a seat for a rider.

(2) Description of the Prior Art

Motorcycle racing is a growing spectator sport. The American Motorcycle Association (AMA) holds races of various classes of motor bikes as part of its Pro Racing tour. Like most racing programs, many sponsors want their logo and a design on a rider's bike, such as on its shroud or air box. These are generally custom painted. For amateur riders, designs these are often pre-printed decals, which are applied to the bike and replaced as needed. These decals are usually made by high volume screen-printing. Specifically, a clear PVC film is printed on the backside in reverse, an adhesive with a protective strip is laminated to the back of the pre-printed film and the decal is die cut out. The rider than removes the protective strip and applies the decal to a selected surface of the bike.

It is also important for the rider to be able to hold on securely to the bike during the ups and downs of the motocross track. One product, which professional riders often use, is called "grip tape." Grip tape is actually sand paper having an adhesive backing and adhered to the surface of the bike adjacent to the rider's legs. The grip tape provides increased friction between the bike and the rider's riding gear that permits the rider to better maneuver the bike. This improved control is especially desirable during motocross racing. In addition, "arm pump" fatigue caused by the rider using his arms trying to hold on may be significantly reduced on a bike having grip tape on the surfaces adjacent to the rider's legs.

One drawback with this product is that the sandpaper wears the rider's clothing, which can be very expensive to replace. In addition, grip tape is not suitable for printed graphics since the sand paper surface would quickly destroy blades used to cut out the shape. However, most pro-riders are well funded and are able to afford new riding gear for each race or as needed.

One product which has been introduced to provide a gripping surface while not ruining the rider's gear is sold under the brand name STOMPGRIP™ traction pads and is available from Stomp Design Inc. of Huntington Beach, Calif. This product was originally designed for snowboarding but is now also sold for motocross. STOMPGRIP™ is a relatively thick vinyl sheet that includes a plurality of raised nubs formed on one surface of a thick sheet of transparent vinyl film. An adhesive surface is applied on the opposite of the film. Like decals, the material is die cut for different shaped motor cycles and applied onto the surface of the bike. However, the size, height and spacing of the nubs of a STOMPGRIP™ traction pad may result in some of the nubs being cut in half when the vinyl sheet is die cut. This causes a sharp surface that the rider's pants may grab the edge and peel it up. Once the edge has started to peel, it continues to do so similarly to conventional package labels.

Thus, there is a need for an improved rider support system that provides increased friction between an area around a motorcycles seat and the rider's legs while, at the same time, does not excessively wear the rider's riding gear or peel easily.

SUMMARY OF THE INVENTION

The present invention is directed to a mount having an improved rider support system. The improved rider support system may include: (a) a mount and (b) a rider support system. The rider support system may include: a seat, a high friction, low abrasion surface adjacent a rider's legs, and an adhesive mounting system for attaching the rider support system to the mount. The low abrasion surface adjacent a rider's legs may be formed from: (i) a surface conforming substrate, (ii) a film having an outer textured surface, and (iii) an adhesive layer between the surface conforming substrate and the film having an outer textured surface.

In the preferred embodiment, the mount is a vehicle. Preferably, the vehicle is a motor powered vehicle such as a motorcycle. The motorcycle may be an off road motorcycle.

Also in the preferred embodiment, the rider support system includes a seat that may be affixed to the mount.

The rider support system also may include an adhesive mounting system. The adhesive mounting system may include a liner and an adhesive layer. The adhesive mounting system may include an acrylic adhesive. The acrylic adhesive may be formulated for low surface energy plastics. Preferably, the acrylic adhesive may be Convex™ HB acrylic adhesive. In the preferred embodiment, the adhesive layer is about 2 mils thick.

In the preferred embodiment, the surface conforming substrate may be print receptive. Preferably, the surface conforming substrate may be a polymer such as vinyl.

The vinyl may be a high plasticizer content vinyl. Preferably, the polymer is between about 4 and 10 mils thick.

Also in the preferred embodiment, the film is a polymer such as vinyl. Preferably, the vinyl has no observed ruptures after 15,000 double rubs when tested according to ASTM 3597. Also preferably, the vinyl is 3M 3647, wherein the textured surface has peaks and valleys between about 6 and about 30 mils. In the preferred embodiment, the difference in height between the peaks and valleys may be less than about 30 mils to improve peel resistance.

Accordingly, one aspect of the present invention is to provide a mount having an improved rider support system comprising: a mount; and a rider support system. The rider support system includes a seat and a high friction, low abrasion surface adjacent a rider's legs.

Another aspect of the present invention is to provide a rider support system for a mount having a seat. The improvement comprises: a high friction, low abrasion surface adjacent a rider's legs, the surface formed from: (i) a surface conforming substrate; (ii) a film having an outer textured surface; and (iii) an adhesive layer between the surface conforming substrate and the film having an outer textured surface.

Still another aspect of the present invention is to provide a mount having an improved rider support system comprising: a mount; a rider support system, the rider support system including: a seat; and a high friction, low abrasion surface adjacent a rider's legs, the surface formed from: (i) a surface conforming substrate; (ii) a film having an outer textured surface; and (iii) an adhesive layer between the surface conforming substrate and the film having an outer textured surface; and an adhesive mounting system for attaching the rider support system to the mount.

These and other aspects of the present invention will become apparent to those skilled in the art after a reading of the following description of the preferred embodiment when considered with the drawings.

DESCRIPTION OF THE PREFERRED EMBODIMENTS

Figure 1:
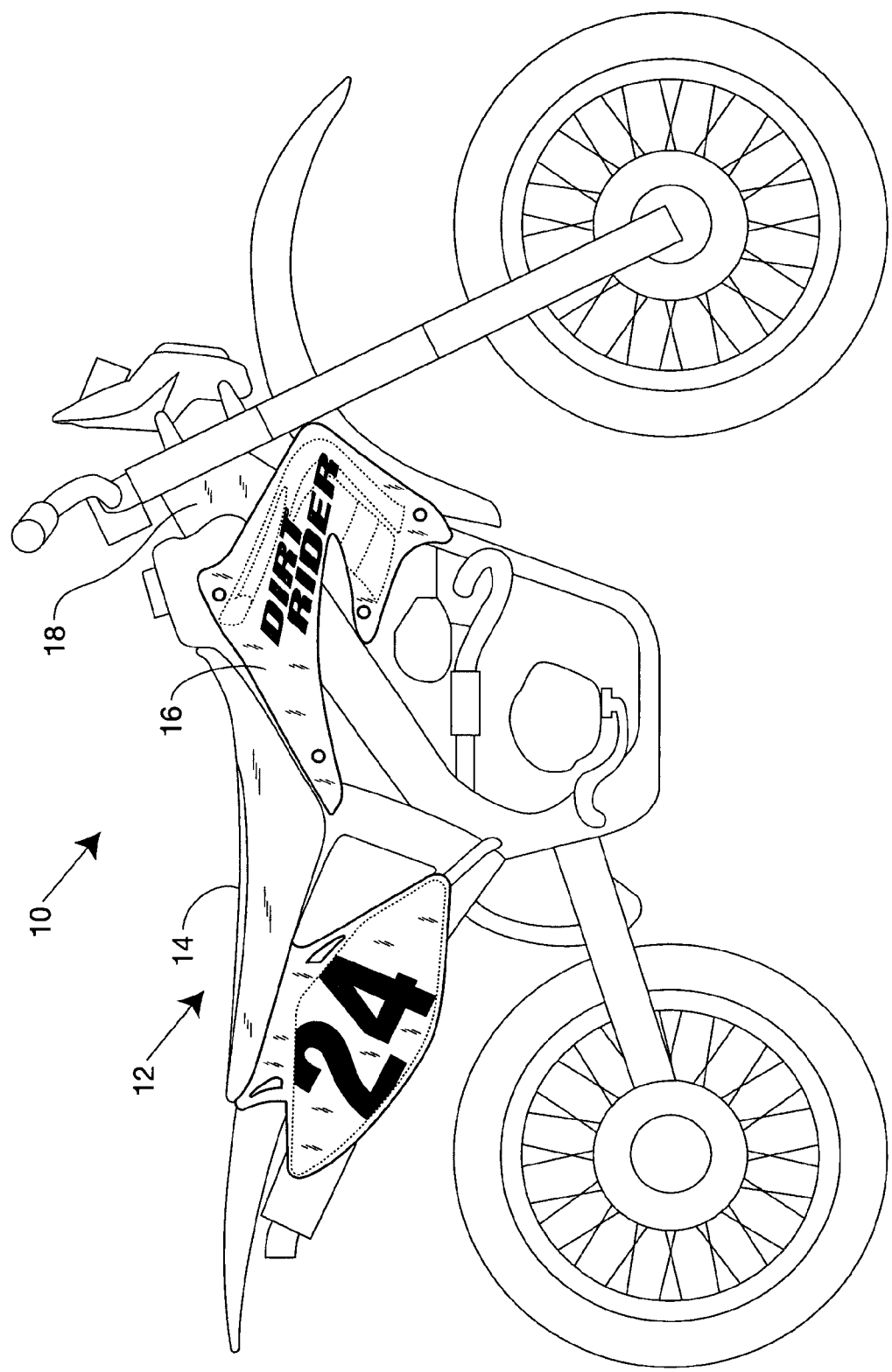
FIG. 1 is a side view of a mount having an improved rider support system constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a mount having an improved rider support system, generally designated 10, is shown constructed according to the present invention. The mount having an improved rider support system 10 includes a mount 18 and a rider support system 12.

The rider support system 12 includes a seat 14 and a high friction, low abrasion surface 16 adjacent a rider's legs. In an embodiment of the invention, the mount 18 is a vehicle, preferably motor powered. The motor powered vehicle may be a motorcycle such as an off road motorcycle adapted for motocross racing.

Figure 2:
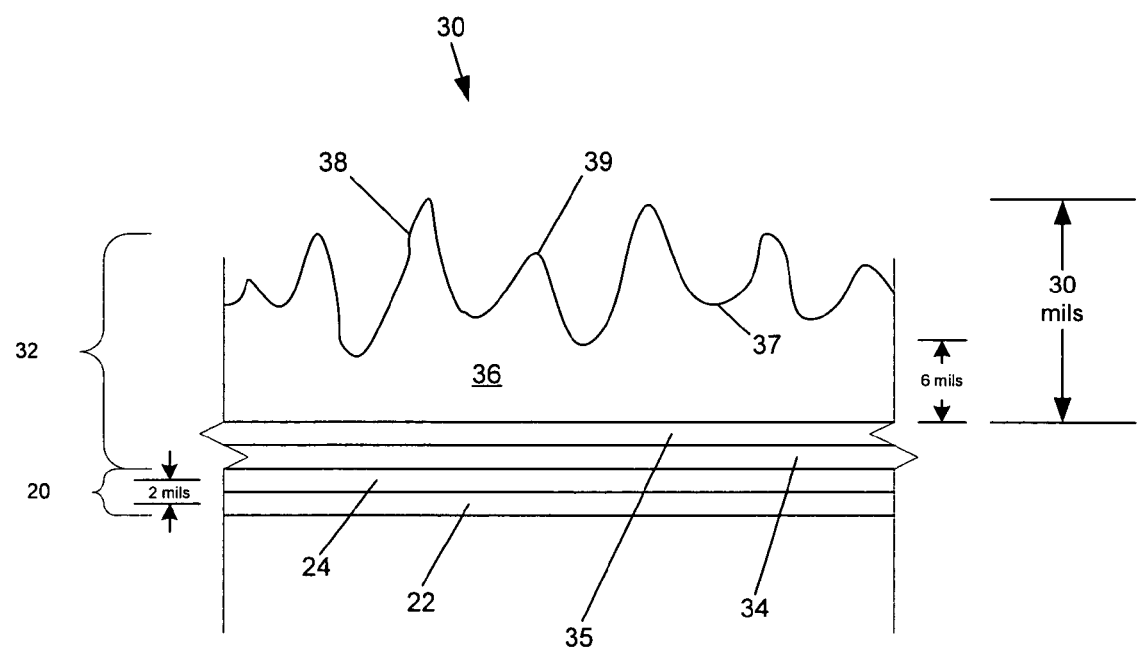
FIG. 2 is a cross sectional view of an adhesive mounting system and support system for a mount having an improved rider support system.

FIG. 2 illustrates an adhesive mounting system 20 for the mount having an improved rider support system 10. In the preferred embodiment, the adhesive mounting system 20 includes a liner 22 and an adhesive layer 24. The adhesive layer 24 preferably includes an acrylic adhesive. The acrylic adhesive includes a high bond strength acrylic adhesive formulated for low surface energy plastics. The acrylic adhesive preferably is Convex™ HB available from Hyatt's Graphic Supply Co., Inc. 910 Main Street, Buffalo, N.Y. The preferably the adhesive layer 24 is about 2 mils thick.

FIG. 2 also illustrates a support system 30 for a mount having the improved rider support system 10. The support system 30 includes a high friction, low abrasion surface 32 adjacent the rider's legs including a surface conforming substrate 34, a film 36 having an outer textured surface 38, and an adhesive layer 35 between the surface conforming substrate 34 and the film 36 having an outer textured surface 38.

In a preferred embodiment of the invention, the surface conforming substrate 34 is print receptive thereby allowing decal-type indicia to be printed thereon. In the preferred embodiment, the surface conforming substrate 34 is a polymer, such as vinyl. Preferably, the vinyl is a highly conformable vinyl. The polymer is between about 4 and about 10 mils thick.

In the preferred embodiment of the invention, the film having an outer textured surface 36 is also a polymer, preferably vinyl. The vinyl has an abrasion rating of about 5 on a 1-5 scale with 5 being the least abrasive when tested according to a modified version of ASTM 3597. In this test, the normal standard is to abrade a stationary textile test material on a Wyzenbeek test machine in a 15,000 double rub cycle against a moving swatch of #10 Cotton Duck material. The purpose of the test is to evaluate when the fibers of the textile test material begin to rupture and to what degree.

For testing the materials in the present invention, the test was modified to replace #10 Cotton Duck moving swatch with test samples of: grip tape, 3M 3647 (outer surface of the present invention), Stomp Grip™ traction pads, clear vinyl laminate, PVC, glass, and hard plastic, while using 600 denier nylon material, a common material used in riding pants, as the stationary test medium. A fresh swatch of 600 denier nylon was used for each test iteration. Thus, the modified test measures the abrasiveness of the test materials against a known material (600 denier nylon) rather than the abrasion resistance of fabric test samples to a moving swatch of a known material.

Each test result for each test sample was assigned a value showing when fiber rupture occurred. The assigned values are as follows: $1 \leq 3,000$ double rubs, $2 \leq 6,000$ double rubs, $3 \leq 9,000$ double rubs, $4 \leq 12,000$ double rubs, and $5 \leq 15,000$ double rubs with no observed rupture.

In the preferred embodiment, the vinyl is 3M 3647 available from the 3M Corporation of Minneapolis, Minn. The outer textured surface 38 has peaks 39 and valleys 37 and preferably is between about 6 and 30 mils. The difference in height between the peaks and valleys is less than about 30 mils, which is believed to increase peel resistance because there are no large peaks that can snag a fabric causing the textured surface to be pulled up.

The 3M 3647 textured surface is a transparent material, which is made and sold as a sidewalk floor laminate that goes on top of sidewalk floor graphics. These graphics are typically seen in grocery stores or out on a sidewalk somewhere for temporary advertising of store "specials." The location on the ad on the sidewalk gives the storeowner another opportunity to get the attention of a potential customer passing by the store in busy cities where there is a lot of pedestrian traffic.

According to the present invention, indicia, such as color panels, numbers, sponsorship, etc., is first printed onto the underlying adhesive mounting system and the surface conforming vinyl substrate 34 just as in conventional printing. Then, between an 8 mil and 12 mil laminate of the high friction, low abrasion surface 32 is added over the printed surface. A computerized plotter using the same mark program that printed the surface is then used to cut out the final shape with a blade type cutter.

Various textured materials were tested to see how much friction they provided, but the 3M product had the greatest amount of friction while, at the same time was unusually thin. For friction testing, a weight first was wrapped in a typical about 600 denier nylon fabric (what most riding pants are made out of). The wrapped weight was then put on an incline that was raised until the weight slid down over the surface of various textured materials. The angle was initially at about 45° degrees from horizontal and gradually increased until the weight began to slide.

In physics, the angle of repose is the inclination of a plane at which a body placed on the plane would remain at rest, or if in motion would roll or slide down with uniform velocity; the angle at which the various kinds of earth will stand when abandoned to themselves. The angle at which the wrapped weight began to slide on a test surface is referred to here as the angle of repose. Table 1 shows the test results for the angle of repose values for a number of test materials including the textured surface preferred in the present invention. The test materials were given a 1 to 5 rating relative to the other materials to permit.

TABLE 1

| Example rating | Description | Angle of Repose | 1 to 5 |
|---|---|---|---|
| 1 | Sandpaper 80 grit | 70° degrees | 5 |
| 2 | 3M 3647 (present invention) | 60° degrees | 4 |
| 3 | STOMPGRIP ™ traction pads | 50° degrees | 3 |
| 4 | Clear vinyl laminate | 45° degrees | 2 |
| 5 | PVC | 45° degrees | 2 |
| 6 | Glass | 30° degrees | 1 |
| 7 | Hard plastic | 30° degrees | 1 |

The above materials were then tested or researched for an abrasion rating, using a modified version of ASTM 3597, and the correlating number of double rubs sustained by the 600 denier nylon prior to rupture. The test results are shown below in Table 2.

TABLE 2

| Example | Description | Abrasion Rating | Double Rubs |
|---|---|---|---|
| 1 | Sandpaper 80 grit | 1 | ≦3,000 |
| 2 | 3M 3647 (present invention) | 5 | 15,000 |
| 3 | STOMPGRIP ™ traction pads | 5 | 15,000 |
| 4 | Clear vinyl laminate | 5 | 15,000 |
| 5 | PVC | 5 | 15,000 |
| 6 | Glass | 5 | 15,000 |
| 7 | Hard plastic | 5 | 15,000 |

The materials were also ranked on a 1 to 5 scale for peel resistance. The test results are shown below in Table 3.

TABLE 3

| Example | Description | 1 to 5 Peel Resistance Rating |
|---|---|---|
| 1 | Sandpaper 80 grit | 5 |
| 2 | 3M 3647 (present invention) | 5 |
| 3 | STOMPGRIP ™ traction pads | 2 |
| 4 | Clear vinyl laminate | 5 |
| 5 | PVC | 5 |
| 6 | Glass | 5 |
| 7 | Hard plastic | 5 |

The above materials ranked based a composite score of the product of abrasion rating and angle of repose. The data is shown below in Table 4.

TABLE 4

| Example | Description | Abrasion Rating | AoR Value | Score |
|---|---|---|---|---|
| 1 | Sandpaper 80 grit | 1 | 5 | 5 |
| 2 | 3M 3647 (present invention) | 5 | 4 | 20 |
| 3 | STOMPGRIP ™ traction pads | 5 | 3 | 15 |
| 4 | Clear vinyl laminate | 5 | 2 | 10 |
| 5 | PVC | 5 | 2 | 10 |
| 6 | Glass | 5 | 1 | 5 |
| 7 | Hard plastic | 5 | 1 | 5 |

Finally, the above materials ranked based on a composite score of the product abrasion rating (AR), angle of repose (AoR), and peel resistance (PR). The data is shown below in Table 5.

TABLE 5

| Example | Description | AR | AoR Value | PR | Score |
|---|---|---|---|---|---|
| 1 | Sandpaper 80 grit | 1 | 5 | 5 | 25 |
| 2 | 3M 3647 (present invention) | 5 | 4 | 5 | 100 |
| 3 | STOMPGRIP ™ traction pads | 5 | 3 | 2 | 30 |
| 4 | Clear vinyl laminate | 5 | 2 | 5 | 50 |
| 5 | PVC | 5 | 2 | 5 | 50 |
| 6 | Glass | 5 | 1 | 5 | 25 |
| 7 | Hard plastic | 5 | 1 | 5 | 25 |

As can be seen in Table 5, the present invention, using the 3M type material has a significant and unexpected combination of high friction (angle of repose "AoR Value" of approximately 4) and low abrasion (abrasion rating "AR" of approximately 5). In addition, since it may be transparent, it also permits seeing a printed graphic or indicia on the underlying substrate.

Certain modifications and improvements will occur to those skilled in the art upon a reading of the foregoing description. For example, screen-printing normally would take a clear piece of vinyl and lay it down on top of the screen printer where the sheet is held down by vacuum so it does not peel up. While a textured surface according to the present invention may be difficult to screen print onto its smooth surface in trying to keep it on the table, it may be possible to increase the air flow or add some mechanical assistance to permit it to be printed. In that case, the textured material would be manufactured without an adhesive on the smooth side and then screen printed. Also, while the mount of the present invention is preferably a motorcycle, the present invention is also applicable to other "mounts" such as jet skis, horses, bulls, mechanical bull and other devices and animals which can be rode by a rider. It should be understood that all such modifications and improvements have been deleted herein for the sake of conciseness and readability but are properly within the scope of the following claims.

We claim:

1. A mount apparatus having an improved rider support system comprising:
    (a) a mount; and
    (b) a rider support system, the rider support system including: (i) a seat; and (ii) a high friction, low abrasion surface adjacent a rider's legs, the surface formed from: a film having an outer textured surface with peaks and valleys between about 6 and about 30 mils.

2. The apparatus according to claim 1 further including an adhesive mounting system for attaching the rider support system to the mount.

3. The apparatus according to claim 2 wherein the adhesive mounting system includes a liner and an adhesive layer.

4. The apparatus according to claim 3 wherein the adhesive layer includes an acrylic adhesive.

5. The apparatus according to claim 4 wherein the acrylic adhesive is formulated for low surface energy plastics.

6. The apparatus according to claim 5 wherein the acrylic adhesive is Convex™ HB acrylic adhesive.

7. The apparatus according to claim 3 wherein the adhesive layer is about 2 mils thick.

8. The apparatus according to claim 1, wherein the mount is a vehicle.

9. The apparatus according to claim 8, wherein the vehicle is motor powered.

10. The apparatus according to claim 9, wherein the motor powered vehicle is a motorcycle.

11. The apparatus according to claim 10, wherein the motorcycle is an off road motorcycle.

12. An improved rider support system for a mount having a seat, the improvement comprising: a high friction, low abrasion surface adjacent a rider's legs, the surface formed from: (i) a surface conforming substrate; (ii) a film having an outer textured surface with peaks and valleys between about 6 and about 30 mils; and (iii) an adhesive layer between the surface conforming substrate and the film having an outer textured surface.

13. The system according to claim 12, wherein the surface conforming substrate is print receptive.

14. The system according to claim 12, wherein the seat is affixed to the mount.

15. The system according to claim 12, wherein the surface conforming substrate is a polymer.

16. The system according to claim 15, wherein the polymer is vinyl.

17. The system according to claim 16, wherein the vinyl is a highly conformable vinyl.

18. The system according to claim 15, wherein the polymer is between about 4 and 10 mils thick.

19. The system according to claim 12, wherein the film is a polymer.

20. The system according to claim 19, wherein the polymer is vinyl.

21. The system according to claim 20, wherein the vinyl has no observed ruptures after 15,000 double rubs when tested according to ASTM 3597 as described herein.

22. The system according to claim 20, wherein the vinyl is 3M 3647.

23. The system according to claim 12, wherein the difference between the peaks and valleys is less than about 30 mils thereby improving peel resistance.

24. A mount apparatus having an improved rider support system comprising:
  (a) a mount;
  (b) a rider support system, the rider support system including: a seat; and a high friction, low abrasion surface adjacent a rider's legs, the surface formed from: (i) a surface conforming substrate; (ii) a film having an outer textured surface with peaks and valleys between about 6 and about 30 mils; and (iii) an adhesive layer between the surface conforming substrate and the film having an outer textured surface; and
  (c) an adhesive mounting system for attaching the rider support system to the mount.

25. The apparatus according to claim 24 wherein the adhesive mounting system includes a liner and an adhesive layer.

26. The apparatus according to claim 25 wherein the adhesive layer includes an acrylic adhesive.

27. The apparatus according to claim 26 wherein the acrylic adhesive is formulated for low surface energy plastics.

28. The apparatus according to claim 27 wherein the acrylic adhesive is Convex™ HB acrylic adhesive.

29. The apparatus according to claim 25 wherein the adhesive layer is about 2 mils thick.

30. The apparatus according to claim 24, wherein the mount is a vehicle.

31. The apparatus according to claim 30, wherein the vehicle is motor powered.

32. The apparatus according to claim 31, wherein the motor powered vehicle is a motorcycle.

33. The apparatus according to claim 32, wherein the motorcycle is an off road motorcycle.

34. The system according to claim 24, wherein the surface conforming substrate is print receptive.

35. The system according to claim 24, wherein the seat is affixed to the mount.

36. The system according to claim 24, wherein the surface conforming substrate is a polymer.

37. The system according to claim 36, wherein the polymer is vinyl.

38. The system according to claim 37, wherein the vinyl is a high plasticizer content vinyl.

39. The system according to claim 36, wherein the polymer is between about 4 and 10 mils thick.

40. The system according to claim 24, wherein the film is a polymer.

41. The system according to claim 40, wherein the polymer is vinyl.

42. The system according to claim 41, wherein the vinyl has no observed ruptures after 15,000 double rubs when tested according to ASTM 3597 as described herein.

43. The system according to claim 41, wherein the vinyl is 3M 3647.

44. The system according to claim 24, wherein the difference between the peaks and valleys is less than about 30 mils thereby improving peel resistance.

* * * * *